US012466043B2

(12) United States Patent
Zhang

(10) Patent No.: US 12,466,043 B2
(45) Date of Patent: Nov. 11, 2025

(54) PNEUMATIC NAILING GUN

(71) Applicant: Qinyao Zhang, Taizhou (CN)

(72) Inventor: Huading Zhang, Taizhou (CN)

(73) Assignee: Qinyao Zhang, Taizhou (CN)

( * ) Notice: Subject to any disclaimer, the term of this patent is extended or adjusted under 35 U.S.C. 154(b) by 0 days.

(21) Appl. No.: 18/774,687

(22) Filed: Jul. 16, 2024

(65) Prior Publication Data

US 2024/0367299 A1 Nov. 7, 2024

Related U.S. Application Data

(63) Continuation of application No. PCT/CN2023/075718, filed on Feb. 13, 2023.

(30) Foreign Application Priority Data

Jan. 17, 2022 (CN) ........................ 202220118974.X

(51) Int. Cl.
*B25C 1/04* (2006.01)

(52) U.S. Cl.
CPC .................................... *B25C 1/047* (2013.01)

(58) Field of Classification Search
CPC ........... B25C 1/047; B25C 1/008; B25C 1/06; B25C 1/04; B25C 1/041
See application file for complete search history.

(56) References Cited

U.S. PATENT DOCUMENTS

| | | |
|---|---|---|
| 6,929,165 B1 | 8/2005 | Chen et al. |
| 7,934,566 B2 | 5/2011 | Hlinka et al. |
| 8,061,573 B2 | 11/2011 | Kramer |
| 8,136,606 B2 | 3/2012 | Krondorfer et al. |
| 8,800,835 B2 | 8/2014 | Perron et al. |
| 8,851,351 B2 | 10/2014 | Yeh |
| 8,960,518 B2 | 2/2015 | Weigmann et al. |
| 9,238,298 B2 | 1/2016 | Wu et al. |
| 9,833,889 B2 | 12/2017 | Lee |

FOREIGN PATENT DOCUMENTS

| | | | |
|---|---|---|---|
| CN | 109623736 A | 4/2019 | |
| CN | 109623737 A | 4/2019 | |
| CN | 111843934 A * | 10/2020 | ............... B25C 1/04 |
| CN | 212978189 U | 4/2021 | |

OTHER PUBLICATIONS

Yang, Machine Translation of CN-111843934-A (Year: 2021).*

* cited by examiner

*Primary Examiner* — Veronica Martin
(74) *Attorney, Agent, or Firm* — Westbridge IP LLC

(57) ABSTRACT

Disclosed is a pneumatic nailing gun. According to the pneumatic nailing gun, an end cover is provided with a locking seat, a locking block is slidably connected in a sliding groove, a moving end of the locking block abuts against an elastic member located at an end portion of the sliding groove, a locking end of the locking block is capable of abutting against a locking member and limiting the movement of the locking member, the locking block is further provided with an open groove, a first piston is provided with an ejector rod, the locking seat is provided with a first bayonet allowing the ejector rod to enter, the ejector rod includes a jacking end and an abutting end arranged on a side edge of the jacking end, the locking seat is further provided with a second bayonet.

10 Claims, 6 Drawing Sheets

PNEUMATIC NAILING GUN

CROSS-REFERENCE TO RELATED APPLICATIONS

This application is a continuation of International Application No. PCT/CN2023/075718, filed on Feb. 13, 2023, which claims priority to Chinese Patent Application No. 202220118974.X, filed on Jan. 17, 2022. All of the aforementioned applications are incorporated herein by reference in their entireties.

TECHNICAL FIELD

The present disclosure belongs to the technical field of mechanical equipment, and particularly relates to a pneumatic nailing gun.

BACKGROUND

Nailing gun, also known as a nail shooter, is a fastening tool for driving a nail into wood and other objects. At present, pneumatic nailing gun is a mainstream product, which mainly uses compressed air as power. High-pressure gas drives a firing pin in an air cylinder of the nailing gun to perform a hammering motion, so as to drive a nail in a nail outlet groove into an object or shoots out a row nail.

In the prior art, in order to facilitate the use of the nailing gun, the high-pressure gas is often generated inside the nailing gun, and a process of generating the high-pressure gas is as follows. Two air cylinders communicated with each other are arranged in the nailing gun to drive a piston connected with a driving mechanism, and a piston connected with the firing pin remains fixed to compress air in a communication space between the two air cylinders, so that an internal pressure of the space is greater than an atmospheric pressure. The method of making the piston connected with the firing pin remain fixed is generally to clamp a front end of the firing pin, so that the firing pin remains locked, so as to limit the movement of the piston. At present, a fastener assembly may also be used to make the piston connected with the firing pin remain fixed.

For example, the Chinese Patent Publication No. CN109623737B discloses a nailing gun with nailing stability, which comprises a shell, a trigger, a motor, a first air cylinder, a second air cylinder, a crank, a connecting rod, a nailing assembly and a nail delivering assembly, wherein the second air cylinder is located in the first air cylinder, a first piston is arranged in the first air cylinder, a second piston is arranged in the second air cylinder, the connecting rod is in transmission connection with the first piston, the motor is in transmission connection with the crank through a transmission mechanism and drives the first piston to move axially in the first air cylinder through the connecting rod, the nailing assembly comprises a firing pin, the firing pin is connected with the second piston, an upper end in the first air cylinder is provided with a fastener assembly for locking the second piston at a high point, the first piston is provided with an unlocking ejector rod, the first piston moves upward to drive the unlocking ejector rod to move upward, the unlocking ejector rod pushes the fastener assembly to be separated from the second piston, and the second piston moves downward under an air pressure to make the firing pin hit the nail.

In practical use, the above patent may have the following problems: when the unlocking ejector rod penetrates through a through hole to abut against a pushing inclined plane, the fastener assembly moves downward, because the fastener is connected with a fastener elastic member, when the fastener moves downward, the fastener elastic member subjects the fastener to an upward elastic force, so that an end portion of the unlocking ejector rod is subjected to an upward pushing force, and because the unlocking ejector rod part still abuts against an upper surface of the through hole at this time, the second piston may deform in a contact position on an air cylinder wall, resulting in air leakage in the sir cylinder, so that a nail shooting force of the nailing gun is insufficient to meet requirements, and the stability of the nailing gun in use is greatly reduced.

SUMMARY

The present disclosure is intended to provide a pneumatic nailing gun aiming at the above problems in the prior art, and the technical problem to be solved by the present disclosure is: how to improve the stability of the pneumatic nailing gun.

The object of the present disclosure can be achieved by the following technical solution: a pneumatic nailing gun comprises an end cover, a first piston and a second piston, wherein the second piston is connected with a locking member, the end cover is provided with a locking seat comprising a sliding groove, a locking block is slidably connected in the sliding groove, a moving end of the locking block abuts against an elastic member located at an end portion of the sliding groove, a locking end of the locking block is capable of abutting against the locking member and limiting the movement of the locking member, the locking block is further provided with an open groove, the first piston is provided with an ejector rod, the locking seat is provided with a first bayonet allowing the ejector rod to enter, the ejector rod comprises a jacking end and an abutting end arranged on a side edge of the jacking end, the locking seat is further provided with a second bayonet, and the abutting end of the ejector rod is capable of abutting against an upper end surface of the second bayonet.

In the solution, the first piston is arranged in the first air cylinder, the second piston is arranged in the second air cylinder, a communication part between the first air cylinder and the second air cylinder forms a sealed cavity, and in an initial state of the nailing gun, the locking end of the locking block abuts against the locking member, so that the second piston remains fixed; during nailing by the nailing gun, a crank-link mechanism connected with the first piston is driven by the motor to push the first piston to move in the first air cylinder, so as to compress air in the sealed cavity, so that a pressure in the sealed cavity meets requirements, the first piston moves towards the first end cover to drive the abutting end of the ejector rod to penetrate through a through hole and the first bayonet to enter the locking seat, then the abutting end continues to move towards the second bayonet and is capable of abutting against an upper end face of the second bayonet, and the jacking end is capable of abutting against the open groove of the locking block at this time; and at this time, the locking end of the locking block is gradually separated from the locking member, and the abutting end of the ejector rod is capable of abutting against the upper end surface of the second bayonet all the time in a process of completely separating the locking end from an end surface of the locking member, so that when the ejector rod is subjected to an upward pushing force from the locking block, the abutting end of the ejector rod is subjected to a force evenly, and the movement is stable, thus ensuring the smooth movement of the first piston, and improving the nailing stability of the nailing gun.

In the pneumatic nailing gun above, the end cover is provided with a moving groove allowing the ejector rod to enter, and the moving groove is matched with the abutting end of the ejector rod. The abutting end enters the moving groove, the moving groove plays a role in avoiding the abutting end, and the solution may also be designed to make the abutting end simultaneously abut against upper end surfaces of the moving groove and the second bayonet, so that the abutting end of the ejector rod is subjected to the force more evenly, and the movement of the first piston is more stable, thus ensuring the nailing stability of the nailing gun.

In the pneumatic nailing gun above, the abutting end is capable of simultaneously abutting against upper end surfaces of the first bayonet and the second bayonet. In a process of movement of the first piston, the abutting end is capable of simultaneously abutting against the upper end surfaces of the first bayonet and the second bayonet, which not only ensures that the abutting end is capable of abutting against the open groove smoothly, but also ensures that the first piston moves more stably in a process of unlocking the second piston.

In the pneumatic nailing gun above, when the abutting end abuts against the upper end surface of the second bayonet, a part of the ejector rod located above the jacking end is capable of abutting against the upper end surface of the first bayonet. In the process of unlocking the second piston, this structure ensures that the movement of the first piston is more stable.

In the pneumatic nailing gun above, when the abutting end enters the upper end surface of the moving groove, the part of the ejector rod located above the jacking end is capable of abutting against the upper end surface of the first bayonet. In the process of unlocking the second piston, this structure ensures that the movement of the first piston is more stable.

In the pneumatic nailing gun above, the end cover comprises a first end cover and a second end cover connected with the first end cover, the moving groove is arranged on the second end cover, and the first end cover is provided with a through hole allowing the ejector rod to enter the open groove.

In the pneumatic nailing gun above, the through hole and the upper end surfaces of the first bayonet and the second bayonet are located on the same horizontal plane. When the jacking end of the ejector rod is subjected to an upward pushing force, the through hole also supports the ejector rod, so that the ejector rod and the first piston move more stably.

In the pneumatic nailing gun above, the through hole, the first bayonet and the second bayonet have the same width, and a width of the ejector rod is less than that of the through hole. The width of the ejector rod is slightly less than that of the through hole, which limits and guides the movement of the ejector rod.

In the pneumatic nailing gun above, a low side surface of the open groove is an inclined plane, the ejector rod comprises the jacking end, the jacking end is an inclined plane, and the jacking end is matched with the inclined plane of the open groove. The inclined plane of the jacking end is capable of making the locking block move towards the elastic member after making contact with the lower side surface of the open groove, and meanwhile, the sliding groove is capable of avoiding the locking block from displacing towards the second bayonet, thus ensuring the movement stability of the locking block.

In the pneumatic nailing gun above, the locking member comprises a locking rod and a locking table, the locking table is boss-shaped, and the locking block is angular and capable of abutting against an inner end surface of the locking table. The locking end is angular, which plays a guiding role when the locking member is locked again, so that the locking by the locking member is more convenient.

Compared with the prior art, the present disclosure has the following advantages.

In the solution, when the locking member is unlocked, the abutting end of the ejector rod is capable of simultaneously abutting against the upper end surfaces of the first bayonet and the second bayonet all the time, so that when the ejector rod is subjected to the upward pushing force from the locking block, the abutting end of the ejector rod is subjected to the force evenly, and the movement is stable, thus ensuring the smooth movement of the first piston, and improving the nailing stability of the nailing gun.

In the solution, the locking end is angular, which plays a guiding role when the locking member is locked again, so that the locking by the locking member is more convenient.

DETAILED DESCRIPTION OF THE EMBODIMENTS

The following descriptions are specific embodiments of the present disclosure, and with reference to the drawings, technical solutions of the present disclosure are further described, but the present disclosure is not limited to these embodiments.

Figure 1:
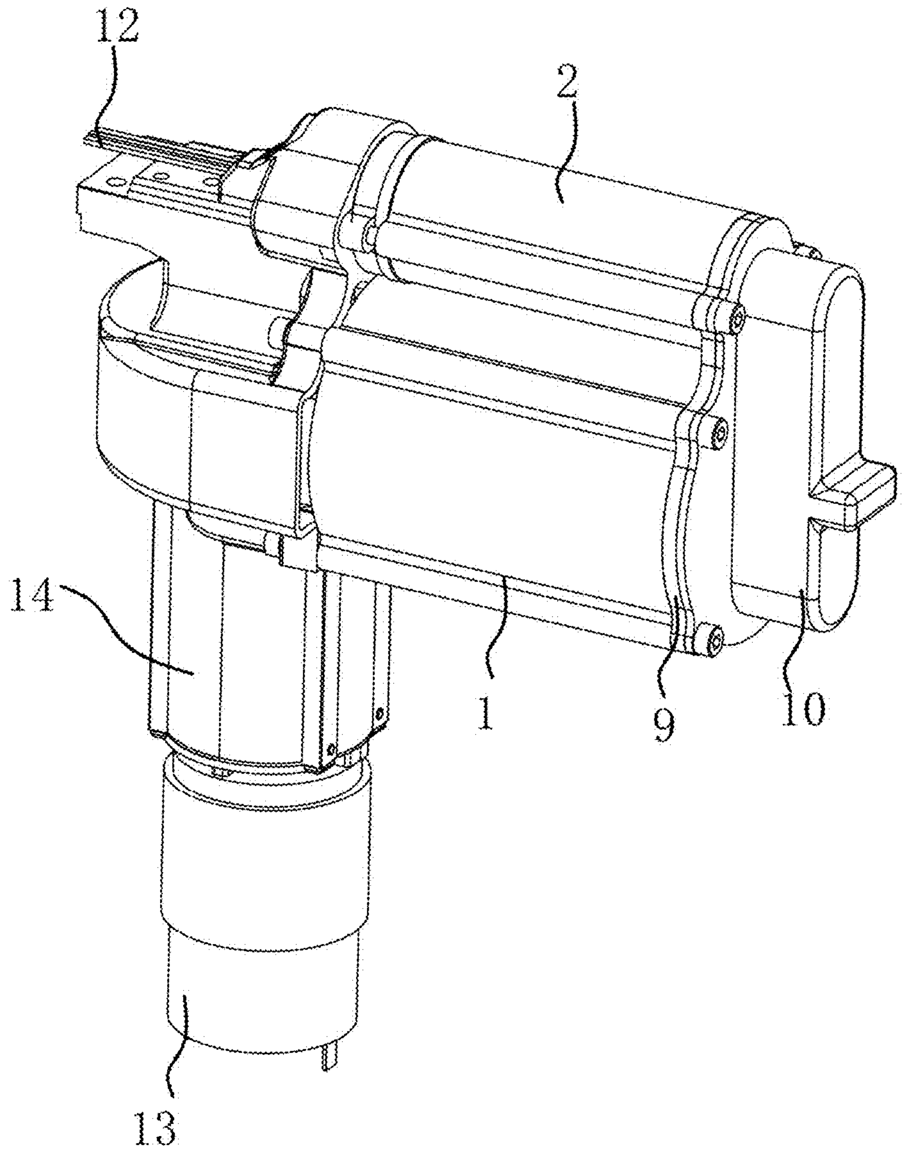
FIG. 1 is a schematic diagram of a stereoscopic structure of the present disclosure.
Figure 4:
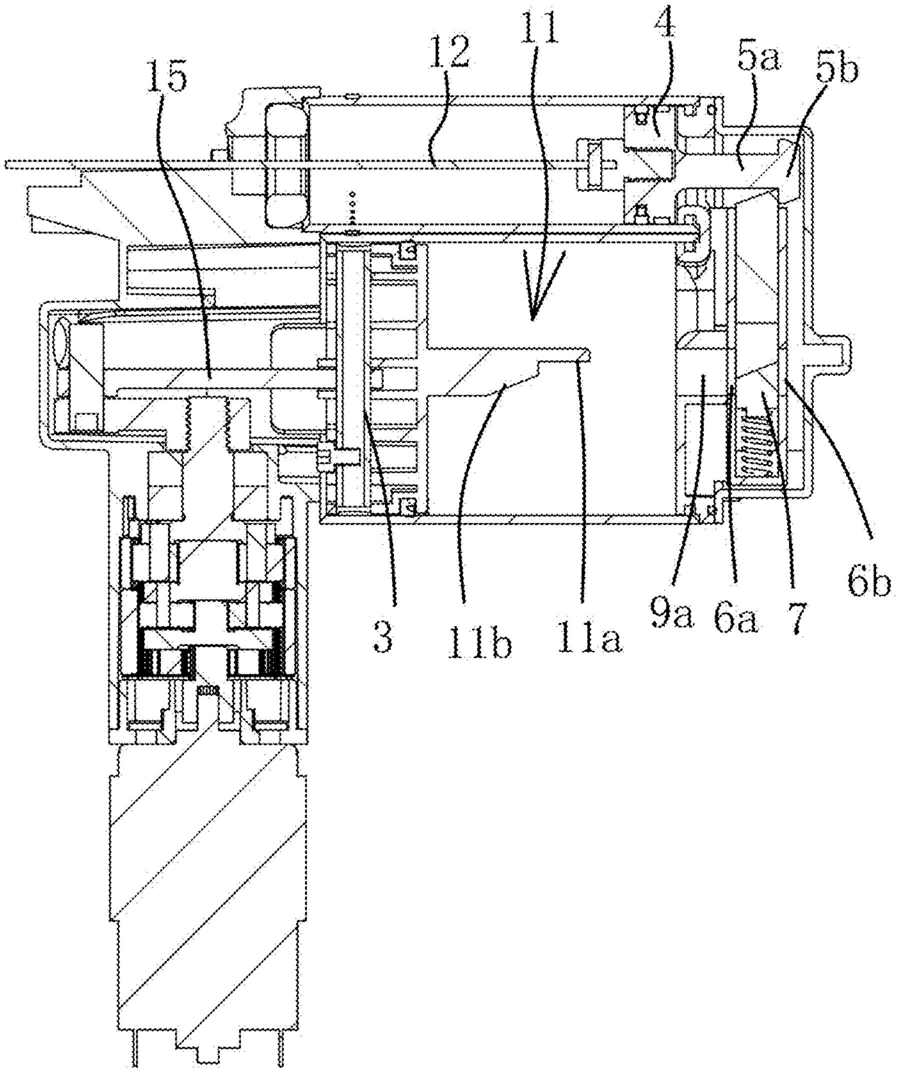
FIG. 4 is a schematic diagram of a sectional structure of the present disclosure.

As shown in FIG. 1 and FIG. 4, a nailing gun comprises a motor 13 and a speed reducer 14 connected with the motor 13, and the nailing gun further comprises a first air cylinder 1 and a second air cylinder 2. A first piston 3 connected with a crank link 15 is arranged in the first air cylinder 1, and a second piston 4 connected with a firing pin 12 is arranged in the second air cylinder 2. The second piston 4 is further provided with a locking member 5, the locking member 5 comprises a locking rod **5*a* and a locking table 5*b*, and the locking member 5 is connected with the second piston 4 through the locking rod 5*a*. In this embodiment, the locking member 5 and the firing pin 12 are in a split structure, and as an alternative solution, the locking member 5 and the firing pin 12 may be in an integrated structure and fixed on the second piston 4. The crank link 15 is connected with the speed reducer 14, the first air cylinder 1 and the second air cylinder 2 are both connected with one end of a first end cover 9, the other end of the first end cover 9 is connected with a second end cover 10, and the first end cover 9 and the second end cover 10 are fixed on the first air cylinder 1 and the second air cylinder 2 through screws. The first air cylinder 1, the second air cylinder 2, the first end cover 9 and the second end cover 10** form a sealed cavity.

Figure 2:
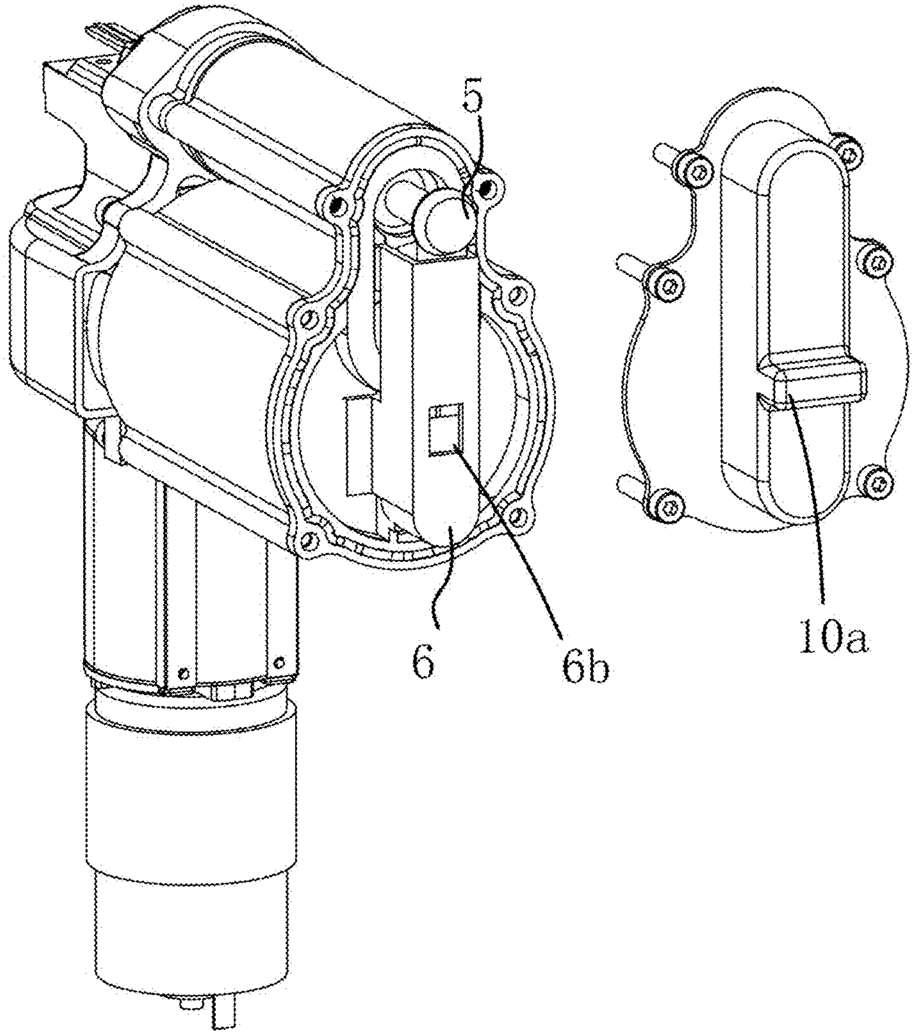
FIG. 2 is a schematic diagram of an exploded structure of the present disclosure.
Figure 3:
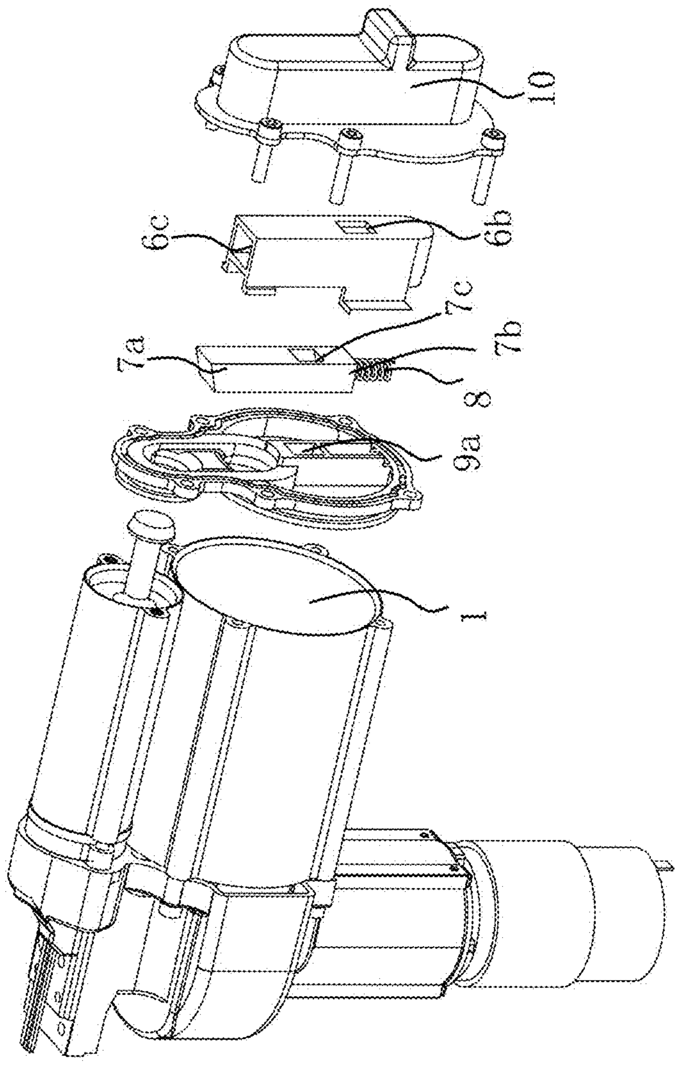
FIG. 3 is a schematic diagram of an exploded structure of the present disclosure.

As shown in FIG. 2, FIG. 3 and FIG. 4, a locking seat 6 comprising a sliding groove 6*c* is fixed on the first end cover 9, the locking seat 6 is provided with a first bayonet 6*a* and a second bayonet 6*b*, and a locking block 7 is slidably connected in the sliding groove 6*c*. The locking block 7 comprises a locking end 7*a* and a moving end 7*b*, the moving end 7*b* of the locking block 7 abuts against an elastic member 8, an end portion of the locking block 7 abutting against the locking table 5*b* is angular, and the locking end 7*a* of the locking block 7 is capable of abutting against an end surface of the locking table 5*b* and limiting the movement of the locking member 5. The locking block 7 is further provided with an open groove 7*c*, and a lower side surface of the open groove 7*c* is an inclined plane. The first piston 3 is provided with an ejector rod 11, the ejector rod 11 comprises an abutting end 11*a* and a jacking end 11*b*, the jacking end 11*b* is an inclined plane, and the jacking end 11*b* is matched with the inclined plane of the open groove 7*c*. A lower end of the locking seat 6 is arc-shaped, and the elastic member 8 is arranged at the lower end of the locking seat 6. In this embodiment, the elastic member 8 is a spring. The first end cover 9 is provided with a through hole 9*a*, the through hole 9*a*, and upper end surfaces of the first bayonet 6*a* and the second bayonet 6*b* are located on the same horizontal plane, the through hole 9*a*, the first bayonet 6*a* and the second bayonet 6*b* have the same width, and a width of the ejector rod 11 is less than that of the through hole 9*a*. The second end cover 10 is provided with a moving groove 10*a* allowing the ejector rod 11 to enter, and the moving groove 10*a* is matched with the abutting end 11*a* of the ejector rod 11.

Figure 5:
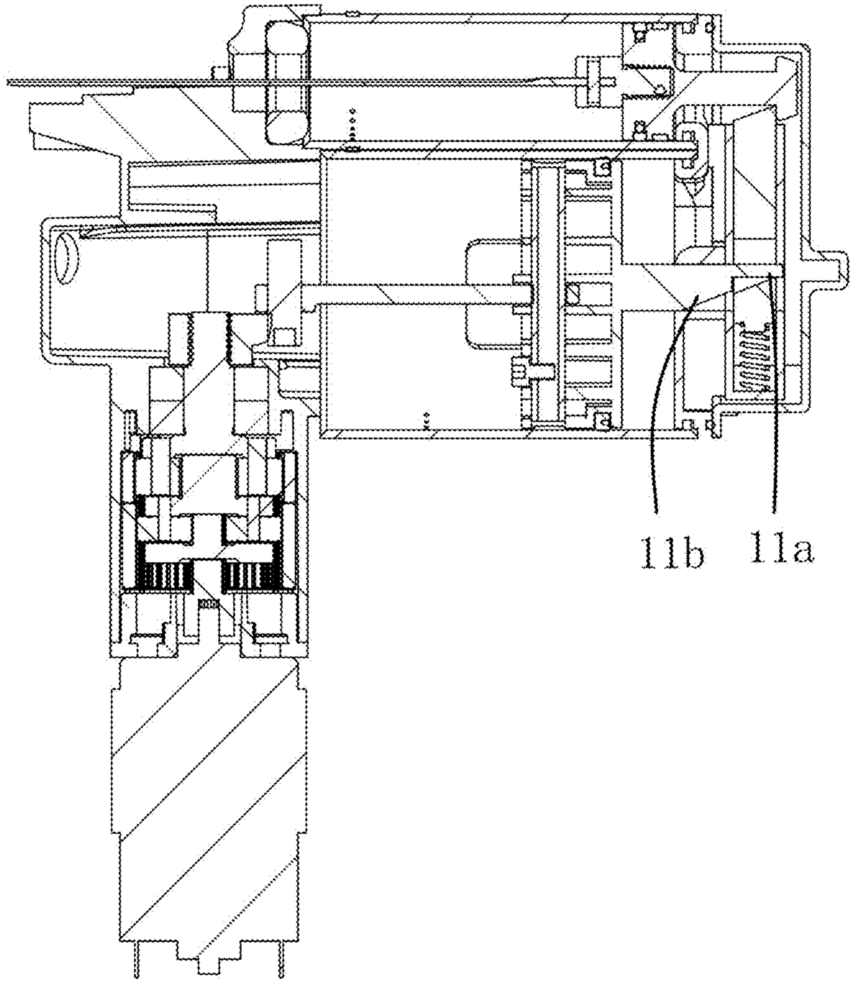
FIG. 5 is a schematic diagram of a sectional structure of the present disclosure.
Figure 6:
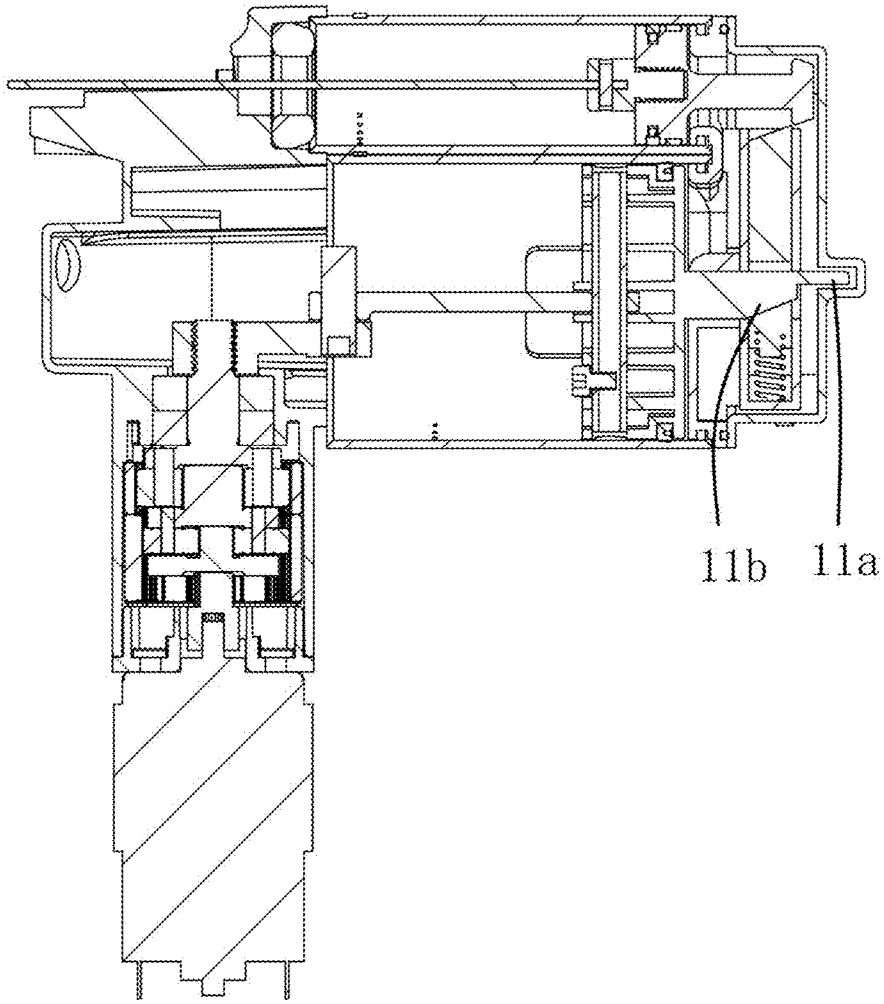
FIG. 6 is a schematic diagram of a sectional structure of the present disclosure.

As shown in FIG. 4, FIG. 5 and FIG. 6, in an initial state of the nailing gun, the locking end 7*a* of the locking block 7 abuts against the end surface of the locking table 5*b*, so that the second piston 4 remains fixed; and when the nailing gun is ready to nail, the crank link 15 connected with the first piston 3 is driven by the motor 13 to push the first piston 3 to compress air in the sealed cavity, so that a pressure in the sealed cavity meets requirements. At this time, the abutting end 11*a* of the ejector rod 11 is capable of abutting against the through hole 9*a* and the upper end surfaces of the first bayonet 6*a* and the second bayonet 6*b*, and the jacking end 11*b* does not touch the open groove 7*c*. During nailing by the nailing gun, the first piston 3 continues to move towards the first end cover 9 to drive the jacking end 11*b* of the ejector rod 11 to penetrate through the through hole 9*a* and the first bayonet 6*a* to enter the locking seat 6. At this time, the locking end 7*a* of the locking block 7 is gradually separated from the inner end surface of the locking table until completely separation is realized. In this process, the abutting end 11*a* of the ejector rod 11 is capable of simultaneously abutting against the upper end surface of the second bayonet 6*b* all the time, a part of the ejector rod 11 abutting against the upper end surface of the first bayonet 6*a* is changed from the abutting end 11*a* into a part located above the jacking end 11*b*, so that when the ejector rod 11 is subjected to an upward pushing force from the locking block 7, the abutting end 11*a* of the ejector rod 11 is subjected to a force evenly, and the movement is stable, thus ensuring the smooth movement of the first piston 3, and improving the nailing stability of the nailing gun.

The specific embodiments described herein are only illustrative to the spirit of the present disclosure. Those skilled in the technical field to which the present disclosure belongs may make various modifications or supplements to the specific embodiments described or make substitutions in a similar way, without departing from the spirit of the present disclosure or exceeding the scope defined by the appended claims.

Although the terms, such as 1: first air cylinder; 2: second air cylinder; 3: first piston; 4: second piston; 5: locking member; 6: locking seat; 6*a*: first bayonet; 6*b*: second bayonet; 6*c*: sliding groove; 7: locking block; 7*a*: locking end; 7*b*: moving end; 7*c*: open groove; 8: elastic member; 9: first end cover; 9*a*: through hole; 10: second end cover; 10*a*: moving groove; 11: ejector rod; 11*a*: abutting end; 11*b*: jacking end; 12: firing pin; 13: motor; 14: speed reducer; and 15: crank link, are frequently used herein, the possibility of using other terms is not excluded. These terms are only used to describe and explain the essence of the present disclosure more conveniently; and the explanation of the terms as any additional restriction is against the spirit of the present disclosure.

What is claimed is:

1. A pneumatic nailing gun, comprising:

an end cover, provided with a locking seat with a sliding groove;

a first piston, provided with an ejector rod;

a second piston, wherein the second piston is connected with a locking member, a locking block is slidably connected in the sliding groove, a moving end of the locking block abuts against an elastic member located at an end portion of the sliding groove, a locking end of the locking block is capable of abutting against the locking member and limiting the movement of the locking member, the locking block is further provided with an open groove;

wherein the locking seat is provided with a first bayonet allowing the ejector rod to enter, the locking seat is further provided with a second bayonet, the ejector rod comprises a jacking end and an abutting end arranged on a side edge of the jacking end, and the abutting end of the ejector rod is capable of abutting against an upper end surface of the second bayonet.

2. The pneumatic nailing gun according to claim 1, wherein the end cover is provided with a moving groove allowing the ejector rod to enter, and the moving groove is matched with the abutting end of the ejector rod.

3. The pneumatic nailing gun according to claim 2, wherein the abutting end is capable of simultaneously abutting against upper end surfaces of the first bayonet and the second bayonet.

4. The pneumatic nailing gun according to claim 3, wherein when the abutting end abuts against the upper end surface of the second bayonet, a part of the ejector rod located above the jacking end is capable of abutting against the upper end surface of the first bayonet.

5. The pneumatic nailing gun according to claim 4, wherein when the abutting end enters the moving groove, the part of the ejector rod located above the jacking end is capable of abutting against the upper end surface of the first bayonet.

6. The pneumatic nailing gun according to claim 3, wherein the end cover comprises a first end cover and a second end cover connected with the first end cover, the moving groove above is arranged on the second end cover, and the first end cover is provided with a through hole allowing the ejector rod to enter the open groove.

7. The pneumatic nailing gun according to claim 6, wherein the through hole and the upper end surfaces of the first bayonet and the second bayonet are located on the same horizontal plane.

8. The pneumatic nailing gun according to claim 7, wherein the through hole, the first bayonet and the second bayonet have the same width, and a width of the ejector rod is less than or equal to that of the through hole.

9. The pneumatic nailing gun according to claim 8, wherein a low side surface of the open groove is an inclined plane, and the jacking end is matched with the inclined plane of the open groove.

10. The pneumatic nailing gun according to claim 9, wherein the locking member comprises a locking rod and a locking table, the locking table is boss-shaped, and the locking block is angular and capable of abutting against an inner end surface of the locking table.

* * * * *